United States Patent [19]

Van Der Ploeg et al.

[11] Patent Number: 4,501,255
[45] Date of Patent: Feb. 26, 1985

[54] DIESEL FUEL FILTER HEATER

[75] Inventors: Arie Van Der Ploeg, Wierden; Wim Jansen, Almelo; Philips Gerson, Velp, all of Netherlands

[73] Assignee: Texas Instruments Incorporated, Dallas, Tex.

[21] Appl. No.: 592,035

[22] Filed: Mar. 21, 1984

[51] Int. Cl.³ .............................................. F02M 31/00
[52] U.S. Cl. .................................... 123/557; 123/549; 210/186
[58] Field of Search ................ 123/557, 549; 210/184, 210/186, 181, 185; 219/205, 206, 207, 307, 548, 504, 505

[56] References Cited

U.S. PATENT DOCUMENTS 4,387,691  6/1983  Marcouy ............................. 123/549
4,406,785  9/1983  Siefer ................................... 123/557

Primary Examiner—Ronald H. Lazarus
Attorney, Agent, or Firm—John A. Haug; James P. McAndrews; Melvin Sharp

[57] ABSTRACT

A heater for diesel fuel filter system has a thermally and electrically conductive heating plate mounted in a housing chamber so that diesel fuel flowing between the chamber inlet and outlet toward a filter normally passes over both sides of the heating plate in heat-transfer relation to the plate. Self-regulating electrical resistance heater discs of a ceramic material of positive temperature coefficient of resistivity are mounted on the plate in thermally and electrically conductive relation to the plate for heating the plate. The heater discs are arranged so that fuel passing through the chamber also flows directly over the heater discs. Groups of spiral segmental baffles are arranged in nested relation to each other on opposite sides of the heating plate to define a plurality of side-by-side spiral fluid flow paths which serve to guide flow of the fuel over substantial lengths of the heating plate surface while also permitting relatively free flow of the diesel fuel through the heater toward the filter unit. The heater heats diesel fuel passing to the filter unit so that, particularly during cold weather, the fuel passes freely through the filter and does not tend to clog the filter due to paraffins or other fuel components tending to solidify in the fuel at low temperatures.

8 Claims, 5 Drawing Figures

DIESEL FUEL FILTER HEATER

BACKGROUND OF THE INVENTION

The field of this invention is that of fuel filters for diesal engines and the invention relates more particularly to a filter system having a heater to prevent cold whether clogging of the filter.

In that regard it is found that although diesel fuels as presently sold are intended to meet desired standards, paraffin residues and the like which remain in the fuel may tend to solidify in the fuel while the fuel is in the fuel tank or filter system when the vehicle is standing idle during cold weather. Thereafter, when engine operation is initiated, those solidified fuel components can temporarily clog the fuel filter system causing poor engine performance particularly during engine starting. Where diesel engines are now becoming more widely used in automobiles they are desirably adapted for more trouble-free operation by nonprofessional drivers who are less likely to be able to cope with such filter clogging problems and the like. For this reason, it would be desirable to provide a diesel fuel filter heater to prevent such filter clogging particularly if such an improvement could be achieved at reasonable cost in a manner which would not impose undue drain on the electrical power supply capacity of the vehicle. Further, where such a heater is primarily useful during engine start up, the heater should be adapted to permit relatively free flow of fuel to the engine during engine start up and thereafter during normal running operation of the engine.

It is an object of this invention to provide a novel and improved diesel fuel filter heater; to provide such a heater which uses low cost components; to provide such a heater which is easily accommodated in conventional fuel filter systems; to provide such a heater which is operable without excessively loading the power supply capacity of a diesel-powered vehicle; and to provide such a heater which permits relatively free flow of fuel through the heater to the engine during engine start up and thereafter.

BRIEF SUMMARY OF THE INVENTION

Briefly described, the novel and improved diesel fuel filter heater of this invention comprises a housing having a chamber with an inlet and an outlet. A thermally and electrically conductive plate means having self-regulating ceramic electrical resistance heater disc means of a material of positive temperature coefficient of resistivity secured in thermally and electrically conductive relation to the plate means is disposed within the housing chamber. Electrically conducting terminal means extend from the housing for connecting the electrical resistance heater disc means to a source of electrical power for heating the plate means. The plate means is located within the heater housing chamber at a location between the chamber inlet and outlet so that diesel fuel flowing through the chamber and passing to a filter normally passes directly over and around both the heating plate means and the ceramic heater disc means in close and efficient heat-transfer relation thereto. The plate means preferably comprises a metal plate having a plurality of spiral segmental baffles which are arranged in nested relation to each other, preferably on both sides of the plate means, so that the baffles define a plurality of side-by-side spiral fluid flow paths over the surfaces of the plate means. The fluid flow paths are adapted to guide the flow of diesel fuel over substantial lengths of the heating plate means and over the heater disc to achieve improved heat-transfer to the fuel while also permitting relatively free flow of the fuel to the engine both during engine start up and during normal running operation of the engine. Preferably the spiral fluid flow paths on one side of the heating plate receive fuel at the inlet of the heater housing chamber and curve in one direction to guide the flow of the diesel fuel from the center of the heating plate means toward and over the peripheral edges of the plate means within the housing chamber. The spiral fluid flow paths on the opposite side of the heating plate means curve in the opposite direction to guide fuel from the peripheral edges of the heating plate means back toward the center of the plate means to flow freely from the outlet of the heater housing chamber to a filter unit. In that way, the fuel is directed along heat transfer paths of substantial length to be efficiently heated while also being directed to flow freely through the heater housing chamber to a diesel engine.

DESCRIPTION OF THE DRAWINGS

Other objects, advantages and details of the novel and improved diesel fuel filter heater of this invention appear in the following detailed description of preferred embodiments of the invention, the detailed description referring to the drawings in which.

DESCRIPTION OF THE PREFERRED EMBODIMENTS

Figure 1:
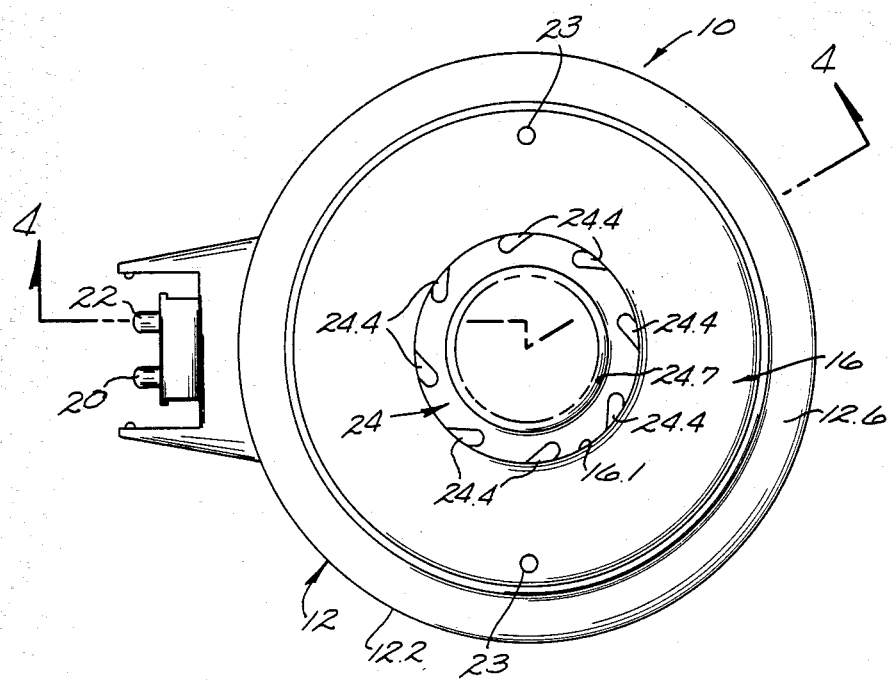
FIG. 1 is a plan view of the heater of this invention.
Figure 3:
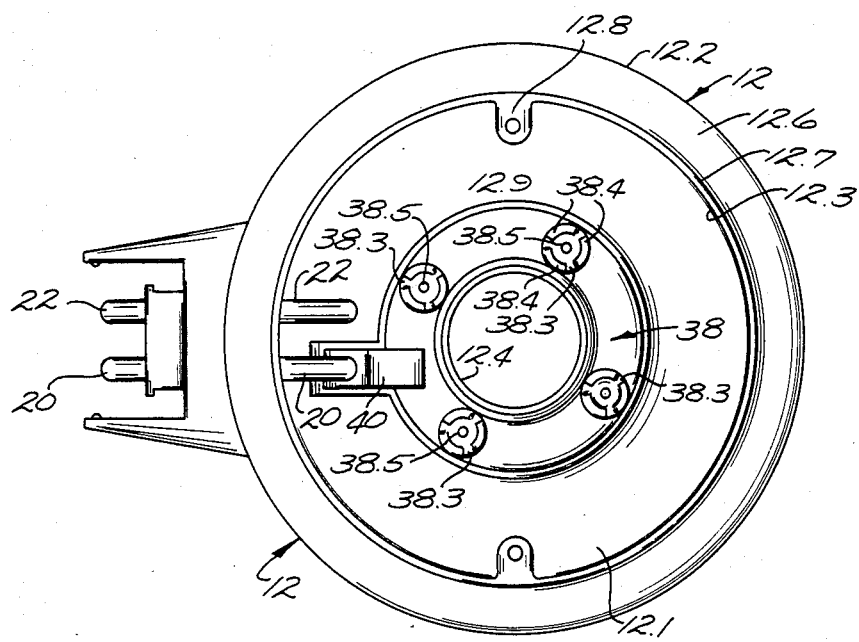
FIG. 3 is a plan view of the heater structure of FIG. 2 showing the heater assembly with the heating plate means removed.
Figure 4:
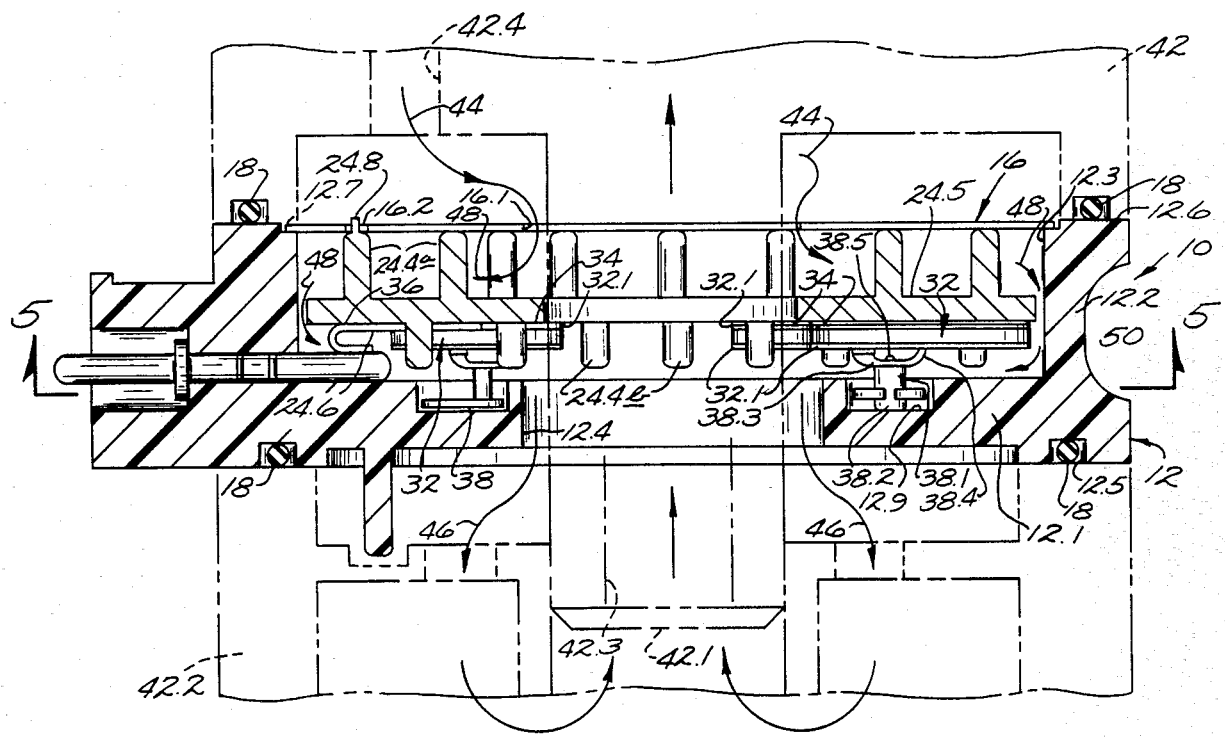
FIG. 4 is a section view along line 4—4 of FIG. 1.

Referring to the drawings, 10 in FIGS. 1 and 4 indicates the novel and improved diesel fuel filter heater of this invention which is shown to comprise a generally cup-shaped housing member 12 preferably formed of an electrically and thermally insulating molded organic material or the like such as glass-filled nylon. The member 12 preferably has a bottom 12.1, a side wall 12.2 and an open end 12.3 forming a housing chamber 14. An opening 12.4 is provided in the member bottom preferably at a central location to serve as an outlet from the housing chamber. A cover 16 preferably formed of a thermally conducting metal material such as aluminum or the like is secured over the open end of the housing member 12 to complete and enclose the housing chamber 14. The cover has an opening 16.1 preferably aligned with the opening 12.4 to serve as an inlet to the chamber 14. The outer surface of the bottom of the member 12 is desirably provided with a gasket groove 12.5 to receive an O-ring gasket 18 or the like and the rim 12.6 of the open end of the member is preferably proportioned to mate with a corresponding gasket groove holding a second O-ring gasket as will be further described below. A pair of terminal means 20 and 22 such as a pair of pins molded into the side wall of the member 12 are arranged to extend from the housing chamber 14 to a location outside the chamber in spaced electrically insulated relation to each other. In a preferred embodiment of the invention, a shoulder 12.7 is molded into the member 12 for receiving the cover 16 and a pair of bosses 12.8 are molded into the member to receive fastening screws or rivets 23 for mounting the cover. Preferably an annular groove 12.9 is formed in the inner surface of the member bottom as shown in FIGS. 3 and 4 for receiving spring contact means therein as described below. Preferably a portion of the groove 12.9 extends under one of the terminals 20 as shown in FIG. 3.

In accordance with this invention, the heater 10 further includes a thermally and electrically conducting plate means 24 formed of a metal material or the like such as pressed aluminum powder. The plate has a generally flat plate portion 24.1 preferably having a diameter or outer peripheral configuration generally corresponding to that of the housing chamber 14 to permit a space 26 of selected limited size to be left between the peripheral edge of the plate portion 24.1 and the inner surface of the sidewall 12.2 of the cup-shaped housing member. Preferably the plate portion has notches 24.2 fitted around the bosses 12.8 in the member and also has locating bumps 24.3 spaced around the plate periphery to engage the side wall for centering the plate in the chamber 14.

Figure 2:
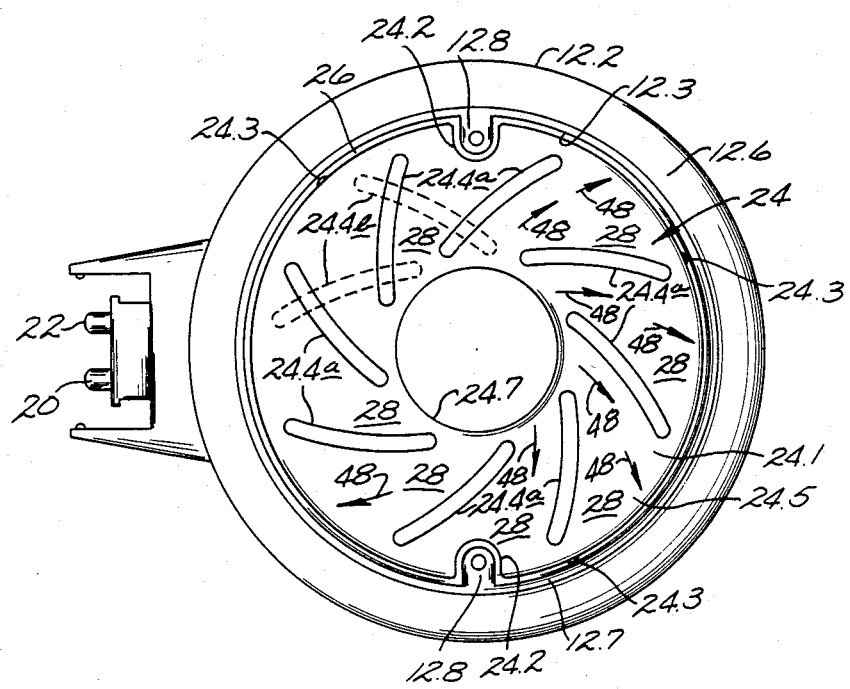
FIG. 2 is a plan view similar to FIG. 1 showing the heater structure with a cover member removed.

In accordance with this invention, the plate means 24 further includes a plurality of baffles 24.4 upstanding from the flat plate portion of the plate means preferably on both sides of the plate to define a plurality of fluid flow guide paths 28 which extend over substantial lengths of the surfaces of the plate means. Preferably for example the baffles have configurations generally corresponding to segments of a spiral or the like and are arranged in groups in nested relation to each other on opposite sides of the flat plate portion for defining a plurality of side-by-side spiral fluid flow guide paths 28 on each of the two opposite sides of the flat plate portion 24.1. Preferably a first group of the spiral segmental baffles 24.4a are arranged in approximately equally spaced nested relation to each other around the central part of a first side 24.5 of the flat plate portion so that the fluid flow paths 28 on that side of the plate means emanate from a central location on the plate means, curve in generally the same directions (clockwise as viewed in FIG. 2), and extend over a substantial length of the plate means toward respective peripheral edge portions of the flat plate portion 24.1. A second group of baffles 24.4b are also arranged in approximately equally spaced relation to each other on a second side 24.6 of the flat plate portion so that the fluid flow paths 28 defined by the those baffles curve in an opposite direction (in a counterclockwise direction as indicated in FIG. 2 by illustration in broken lines of two of the baffles from the second group). The plate means 24 is preferably provided with a central opening 24.7 aligned with the inlet and outlet openings 16.1 and 12.4 of the housing chamber.

Figure 5:
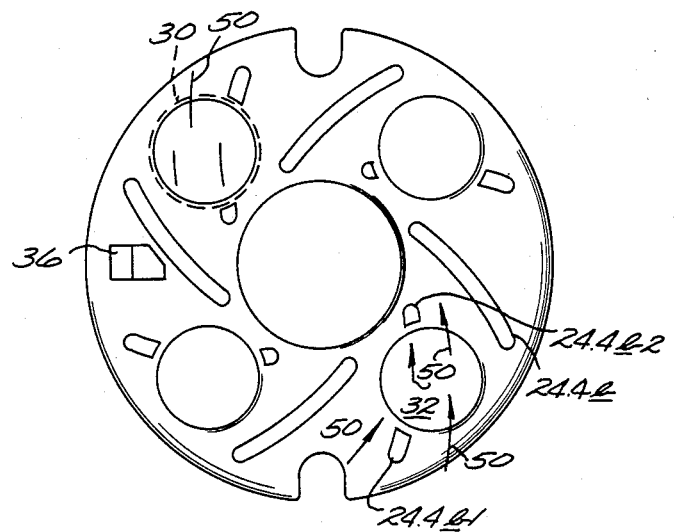
FIG. 5 is a partial section view along line 5—5 of FIG. 4 illustrating other aspects of the heater plate means utilized in the heater of this invention.

In accordance with this invention, at least some of the spiral segmental baffles 24.4 are preferably interrupted for forming spaces on the flat plate portion to accommodate heater disc means at locations where they intercept the fluid flow paths 28 as above described. Preferably for example, the baffles 24.4b are interrupted as indicated at 24.4b 1 and 24.4b 2 in FIG. 5 for forming spaces indicated by the broken lines 30 on the second side of the flat plate portion 24.1. Self-regulating electrical resistance heater disc means 32, preferably of a ceramic material of positive temperature coefficient of resistivity having metalized contact coatings 32.1 on opposite sides thereof, are mounted in those spaces 30 in electrically and thermally conducting relating to the plate means 24. Preferably for example, such heater discs formed of a lanthanum-doped ceramic or the like which is adapted to display a sharp increase in resistivity when heated to its Curie temperature have one contact side 32.1 secured to the flat portion 24.1 by use of an electrically and thermally conducting bonding means 34 such as a silver-filled epoxy or the like. Preferably a spring contact blade or element 36 is soldered or otherwise electrically connected to the plate means 24 and is arranged to make electrical contact to the terminal 22 when the plate means 24 is disposed in the housing chamber 14 as shown in FIGS. 2 and 4. In accordance with this invention, the contact layers 32.1 on the opposite sides of the heater disc means 32 are connected in electrically parallel relation to each other to the other heater terminal 20 as is shown in FIGS. 3 and 4. In a preferred embodiment of the invention for example, an electrically conductive metal ring 38 is mounted in the groove 12.9 in the housing member 12. A plurality of pins 38.1 are secured to the ring at spaced locations around the ring by rivet means 38.2 or the like and circular contact spring discs 38.3 each having a plurality of spring blades 38.4 upstanding from the discs are secured at the opposite ends of the pins by other rivet means 38.5 or the like. The spring discs 38.3 are located to resiliently and electrically engage the blades 38.4 with the contact layers 32.1 on said opposite sides of the respective heater discs 32. A spring contact blade 40 or the like is soldered or otherwise electrically connected to the ring 38 to fit under the terminal 20 to resiliently electrically engage that terminal as shown in FIG. 3.

In the structure, the heater plate means 24 is easily and economically formed by molding or the like. The heater disc 32 are easily and reliably attached to the plate means. The plate means with attached heater discs is disposed in the housing chamber 14 and the cover 16 is secured in place to bear against the plates means and hold it in assembled relation with the spring contact means 38, to hold the contact spring discs 38.3 in electrical engagement with opposite sides of the respective heater discs 32, and to hold the spring blades 36 and 40 in resilient electrical engagement with the terminals 22 and 20. If desired, one baffle is provided with a detent 24.8 fitted into a hole 16.2 in the cover for securing the plate means 24 in a desired angular orientation in the chamber 14.

As thus described the heater 10 is easily and advantageously used in a conventional diesel fuel supply system or the like illustrated diagrammatically at 42 in FIG. 4 for efficiently heating diesel fuel flowing to a filter unit in the supply system. That is, the opening 24.7 in the heating plate means cooporates with the aligned inlet and outlet openings 16.1 and 12.4 of the heater 10 to fit over a filter-mounting tube 42.1 in the conventional fuel supply system. Such a mounting tube typically serves for detachably mounting filter unit 42.2 in the system and also provides an outlet 42.3 for filtered fuel to flow from the filter to a diesel engine. The rim 12.6 of the heater housing member fits in sealing relation to an O-ring gasket 18 provided on the diesel fuel supply system so that diesel fuel entering the system through a system inlet 42.4 flows into the heater inlet 16.1 around the filter-mounting tube 42.1 as indicated by the arrows 44 in FIG. 4. The attachment of the filter unit to the mounting tube then serves to hold the heater 10 in place and to secure the filter unit 42.2 in sealing relation to a second O-ring gasket 18 for receiving fuel from the heater 10 around the mounting tube as is indicated by the arrows 46 in FIG. 4. In the heater of this invention, the terminals 20 and 22 are conveniently connected to an electrical power source on a diesel engine so that the heater discs 32 are electrically energized and transfer heat to the plate means 24 when engine operation is initiated. The diesel fuel provided by the supply system then flows into the inlet 16.1 and is received in the fluid flow guide paths 28 formed on the first side of plate means 24. The diesel fuel is directed to flow in heat transfer relation to the plate means over substantial lengths of the plate means through the paths 28 toward and over the outer peripheral edge of the plate means as indicated by the arrows 48. The fuel then passes through the space 26 and is received within the fluid flow guide paths 28 formed on the second side of the plate means. Because the guide paths on the opposite side of the plate means curve in an opposite direction, the diesel fuel flows smoothly into those guide paths and is directed from the peripheral edge of the plate means toward the outlet 12.4 from the heater by passing over substantial lengths of the second side of the plate means 24. In flowing toward the outlet 12.4 the diesel fuel also flows directly over the heater discs which are mounted to intercept the paths 28 so that the fuel is additionally heated by such direct contact with the heater discs. The heated diesel fuel then flows from the heater outlet 12.4 into the filter unit 42.2 and from the supply system outlet 42.3 as indicated by the arrows 50. In that way, the novel and improved heater of this invention utilizes a simple, reliable and economical structure. The structure is adapted to provide highly efficient heating of diesel fuel flowing to the filter unit 42.2. Accordingly the heater is operable to achieve desired fuel heating for avoiding filter clogging while requiring use of only a relatively limited portion of the electrical power supply capacity of the diesel engine. However the fluid flow path through the heater is such that diesel fuel flows smoothly to the filter unit and the diesel engine both during initial engine start up and during normal running operation of the engine.

It should be understood that although particular embodiments of the novel and improved diesel fuel filter of this invention have been described by way of illustrating the invention, this invention includes all modifications and equivalents of the disclosed embodiments falling within the scope of the appended claims.

I claim:

1. A heater for a diesel filter system comprising a housing means having a chamber with an inlet and an outlet for permitting diesel fuel to flow therethrough to a diesel fuel filter, thermally and electrically conducting plate means having self-regulating ceramic electrical resistance heater disc means of a material of positive temperature coefficient of resistivity secured in thermally and electrically conducting heat-transfer relation to the plate means, said plate means being mounted within the housing means at a location intermediate the inlet and outlet thereof so that the flow of diesel fuel through the chamber between the inlet and outlet normally passes the fuel directly over and around the plate means and the ceramic heater disc means in heat-transfer relation thereto, and electrically conducting means extending from the housing means for electrically connecting the electrical resistance heater disc means to a source of electrical power for energizing the heater disc means to heat the fuel, characterized in that the plate means comprises a plate having a flat plate portion and having baffle means upstanding from at least one side of the flat plate portion defining a plurality of side-by-side, spiral, fluid flow paths on the plate means to guide the flow of diesel fuel over substantial lengths of the plate means in heat-transfer relation thereto while permitting relatively free flow of such fuel over the plate means toward the chamber outlet.

2. A heater as set forth in claim 1 further characterized in that the baffle means comprise a plurality of baffles of spiral segmental configuration arranged in nested relation to each other on at least one side of said flat plate portion defining said spiral paths between adjacent pairs of the baffles to guide flow of diesel fuel between central and peripheral parts of said flat plate portion.

3. A heater as set forth in claim 2 further characterized in that the baffles are disposed on said one side and on an opposite side of the flat plate portion, the baffles on said one side being arranged to define fluid flow paths curving in one direction from a central part of said one side toward and over edges of peripheral parts of said one side of the flat plate portion and the baffles on the opposite side being arranged to define fluid flow paths curving in an opposite direction to guide the flow of diesel fuel over substantial lengths of said opposite side of the flat plate portion from said edges of said peripheral parts toward a central part of said opposite side of the flat plate portion, thereby permitting relatively free flow of fuel over both sides of the plate means as the fuel is guided toward the chamber outlet.

4. A heater as set forth in claim 3 further characterized in that the spiral segmental baffles on a side of the flat plate portion are interrupted for providing space between said baffles to intercept said fluid flow paths, and the electrical resistance heater disc means are secured to the flat plate portion of the plate means on said side within said space for permitting diesel fuel flowing in the fluid flow paths defined by said baffles to flow directly over the heater disc means in direct heat-transfer relation thereto.

5. A heater as set forth in claim 4 further characterized in that a plurality of said baffles are interrupted for providing a plurality of spaces on said side of the flat plate portion, said spaces being disposed in equally spaced relation to each other around the central part of said side of the flat plate portion.

6. A heater for a diesel fuel system comprising a cup-shaped housing member having a bottom, a side wall, and an open end, a cover secured to the member over said open end for forming a housing chamber, the cover and the member bottom having openings therein forming an inlet and an outlet for the chamber, a flat thermally and electrically conductive plate mounted within the chamber intermediate the inlet and outlet, the plate having a central opening cooperating with the inlet and outlet to fit over a filter-mounting fuel outlet tube in a diesel fuel supply system so that the flow of diesel fuel through the chamber between the inlet and outlet toward a filter mounted on the tube normally passes the fuel over the plate in heat-transfer relation thereto, one side of the plate having a plurality of spiral segmental baffles arranged in nested relation to each other thereon for defining a plurality of side-by-side spiral fluid flow paths curving in one direction to guide the flow of diesel fuel entering the chamber inlet over substantial lengths of said one side of the plate from the central part of the plate toward and over peripheral edges of the plate, an opposite side of the plate having a plurality of spiral segmental baffles arranged in nested relation to each other for defining a plurality of side-by-side spiral fluid flow paths curving in an opposite direction to guide the flow of diesel fuel over substantial lengths of said opposite sides of the plate from said peripheral edges toward the central part of the plate and through the chamber outlet, the baffles at said opposite plate side being interrupted for providing a plurality of spaces intercepting said fluid flow paths, a plurality of electrical resistance heater discs of a material of positive temperature coefficient of resistivity having one side secured in electrically and thermally conducting relation to said opposite plate side within said respective spaces so that diesel fuel flowing in the fluid flow paths defined by said baffles flows over the heater discs in direct heat transfer relation thereto, and means extending from the housing chamber electrically connecting the plate and opposite sides of the respective heated discs to a source of electrical power for heating the discs and plate to heat diesel fuel flowing through the housing chamber, whereby diesel fuel flowing through the chamber is rapidly heated while permitting relatively free flow of the fuel toward the chamber outlet.

7. A heater as set forth in claim 6 further characterized in that a pair of terminal means extend from the housing in spaced electrically insulated relation to each other to connect to an electrical power source, first spring means are disposed within the housing chamber between the plate and said member bottom for electrically connecting one of the terminal means to said opposite sides of the heated discs, second spring means electrically connect the plate to the other terminal means, and said first spring means serve to hold the plate at a desired location within the housing chamber.

8. A heater as set forth in claim 7 further characterized in that the cup-shaped housing member is formed of a thermally and electrically insulating material, and said cover is formed of a thermally conducting material for facilitating transfer of heat from the plate to diesel fuel entering the housing inlet.

* * * * *